United States Patent [19]
Nakahira et al.

[11] Patent Number: 5,881,870
[45] Date of Patent: Mar. 16, 1999

[54] CASE FOR CASING RECORDING MEDIA

[75] Inventors: Motoi Nakahira, Ibaraki; Kazuo Funatsu, Osaka, both of Japan

[73] Assignees: Motoi Nakahira; Sanu Corporation, both of Osaka, Japan

[21] Appl. No.: 856,687

[22] Filed: May 15, 1997

[30] Foreign Application Priority Data

May 17, 1996 [JP] Japan ................................. 8-132359

[51] Int. Cl.$^6$ .................................................. B65D 85/57
[52] U.S. Cl. ...................... 206/308.1; 206/232; 206/311; 206/449
[58] Field of Search .............................. 206/308.1, 308.2, 206/308.3, 309, 311, 312, 313, 449, 450, 232

[56] References Cited

U.S. PATENT DOCUMENTS

| | | | |
|---|---|---|---|
| 2,345,230 | 3/1944 | Bender | 206/311 |
| 2,679,929 | 6/1954 | Fleisig | 206/309 |
| 3,547,342 | 12/1970 | Smith et al. | 206/312 |
| 4,549,658 | 10/1985 | Sfikas | 206/312 X |
| 4,793,477 | 12/1988 | Manning | 206/232 |
| 5,078,270 | 1/1992 | Campbell | 206/308.1 |
| 5,207,717 | 5/1993 | Manning | 206/232 |
| 5,501,540 | 3/1996 | Ho | 206/308.1 X |
| 5,588,527 | 12/1996 | Youngs | 206/308.1 |
| 5,588,528 | 12/1996 | Ozeki | 206/308.1 |

FOREIGN PATENT DOCUMENTS

| | | | |
|---|---|---|---|
| 1213757 | 11/1959 | France | 206/309 |
| 1215093 | 11/1959 | France | 206/313 |
| 07061185A | 3/1995 | Japan . | |
| 0676699 | 2/1991 | Switzerland | 206/312 |

*Primary Examiner*—Bryon P. Gehman
*Attorney, Agent, or Firm*—Armstrong, Westerman, Hattori, McLeland & Naughton

[57] ABSTRACT

A case for recording media used for binding or fastening a recording medium, such as a compact disc, in a book, for example, weekly or monthly magazines, and comprising a board, a film adhered thereto to form a casing space into which a disc is put, the case being bound or fastened in the book with both ends of the board being matched, the disc being allowed to be readily taken out of the casing space through a gateway by disconnecting the case from the book and unfolding the case, or by cutting the case at a folding section, and the disc further allowed to be put into the casing space again under the same conditions as that exists before the disc is taken out.

13 Claims, 17 Drawing Sheets

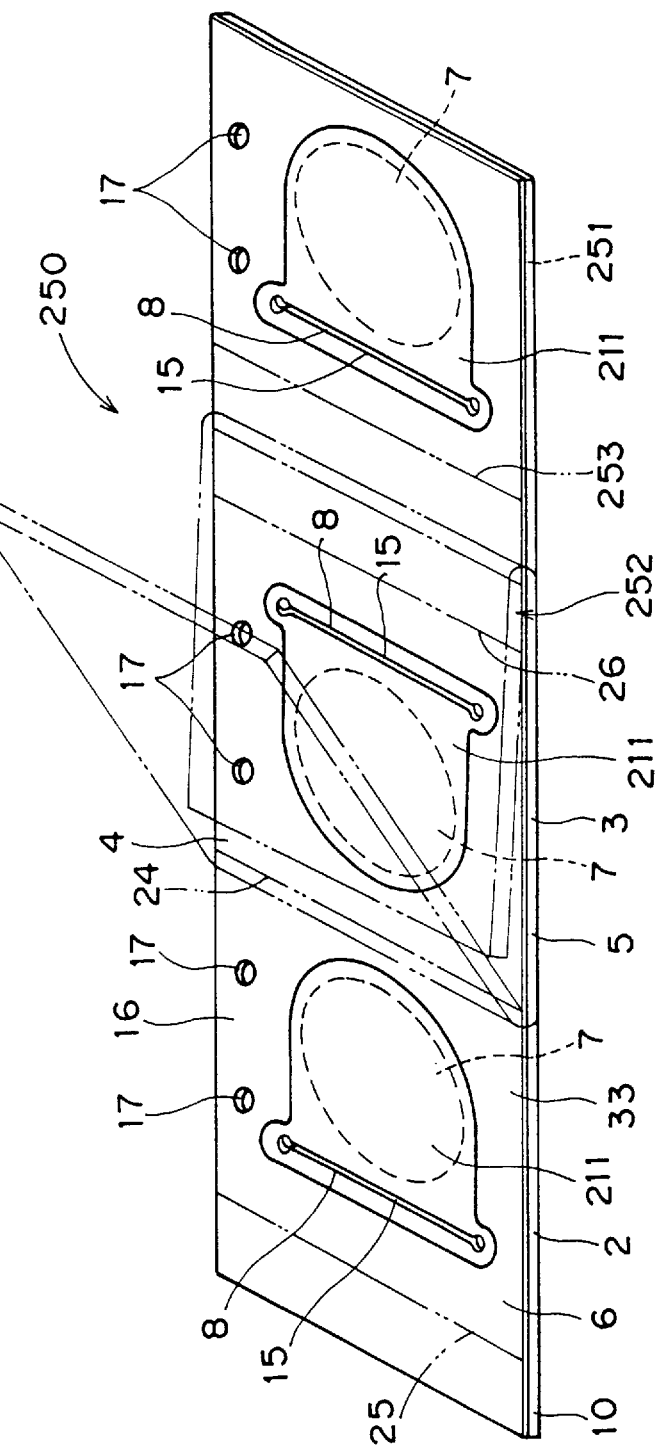

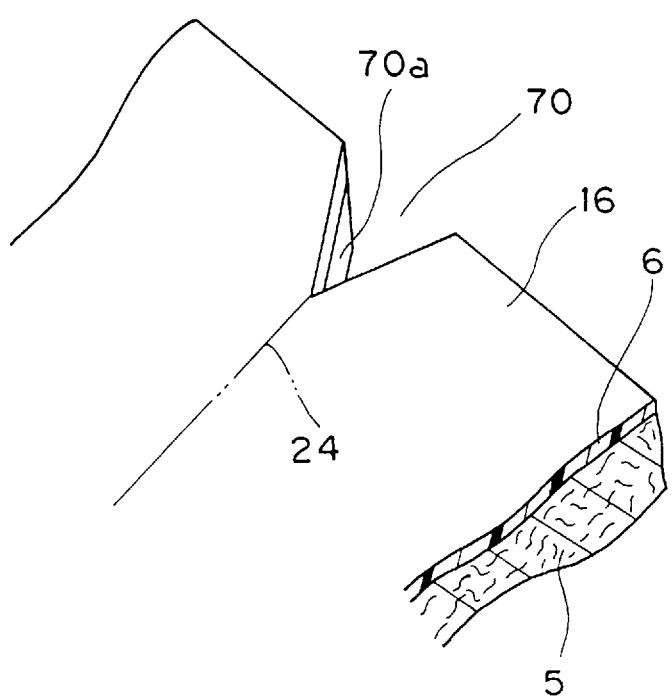

CASE FOR CASING RECORDING MEDIA

BACKGROUND OF THE INVENTION

1. Field of the Invention

The present invention relates to a case for casing recording media, such as a compact disc, which case is used for binding or fastening the recording medium in or to books, for example, weekly or monthly magazines, and more particularly to a case for casing recording media wherein the cased recording medium, e.g. a compact disc, is quite readily taken out and cased again.

2. Description of the Prior Art

A case for casing recording media in this kind hitherto proposed comprises a board having a casing bore which extends through the board in the direction of thickness thereof to receive and hold recording media, such as a compact disc, and a covering paper is fixed by use of adhesives to surfaces of both sides of the board to prevent the compact disc from falling. One of the covering papers for a recording side of the compact disc is adapted to cover the whole surface of the recording side to protect the same. The other covering paper covering a side of the compact disc opposite to the recording side is provided with a window hole having a smaller diameter than the compact disc through which hole the compact disc can be seen or identified. The case for casing recording media may be bound or fastened in books to allow a compact disc to be included therein, for example, as an appendix to the book.

Conventionally, the board and the covering papers make use of paperboards and are firmly adhered to each other by adhesives in order to protect the cased compact disc. Hence, it is troublesome to take out the compact disc of the case. And once the compact disc is taken out, a part of at least one of the covering papers is completely peeled off the board, so that re-casing the compact disc is impossible.

SUMMARY OF THE INVENTION

An object of the present invention is to provide a case for casing recording media wherein a cased recording medium, such as a compact disc, is readily taken out and cased again.

A case for casing recording media according to the present invention comprises:

a board element which has an area larger than a planar shape of a recording medium to be cased and includes a casing region larger than the recording medium; and a sheet member adhered to the board element at a residual region located externally of the casing region, wherein the casing region between the board element and the sheet member is provided with a casing space for casing the recording medium, and the casing space is open for allowing the recording medium to pass.

According to the invention, the sheet member is adhered to the board element larger in area than the recording medium to form the casing space which is open for allowing the recording medium to pass. The recording medium can be cased in the casing space. When the recording medium is cased in the casing space, there exists at the outside of the periphery of the recording medium the residual region of the board element located externally of the casing region. Hence, the recording medium cased in the casing space is prevented from being hit to be damaged by a foreign or external object which and when hits against the case. Besides, the recording medium when cased in the casing space is covered at a surface of one side with the board element and at the other side surface with the sheet member, so that the recording medium can be prevented from being damaged when an external or foreign object hits against the case. The recording medium is accordingly protected in the casing space. Moreover, the casing space is formed in the casing region in the board element, and the casing region is set in size and shape correspondingly to the recording medium, so that the recording medium in the casing space does not easily shift from or move out of the casing space due to vibration or tilting applied to the case. Furthermore, the casing space is open by use of a customary means, for example, by forming a slit or a cut on the sheet member or by forming non-adhering region between the sheet member and the board element, so that the recording medium may be put into or taken out of the casing space through the opening. The recording medium is cased in the casing space being open as above and is surely kept in the cased state without easily slipping off the casing space due to the vibration or tilting applied to the case, and the recording medium can be readily taken out of the casing space through the opening. The case according to the present invention has and utilizes such simple feature or structure that the sheet member is adhered to the board element to form the casing space being open, so that the recording medium can be surely held in the casing space and repeatedly taken out of or put into the same.

A case for casing recording media according to further invention comprises:

a board element which has an area larger than a planar shape of a recording medium to be cased and includes a casing region larger than the recording medium; and a sheet member adhered to the board element at a residual region located externally of the casing region, wherein the casing region between the board element and the sheet member is provided with a casing space for casing the recording medium; the casing space is open for allowing the recording medium to pass; and the case is fixed to an article with at least the opening of the casing space being covered.

According to the invention, the sheet member is adhered to the board element larger in area than the recording medium to form the casing space which is open for allowing the recording medium to pass. The recording medium can be cased in and taken out of the casing space through the opening repeatedly. When the recording medium is cased in the casing space, there exists at the outside of the periphery of the recording medium the residual region of the board element located externally of the casing region. Hence, the recording medium cased in the casing space is prevented from being hit to be damaged by a foreign or external object which and when hits against the case. Besides, the recording medium when cased in the casing space is covered at a surface of one side with the board element and at the other side surface with the sheet member, so that the recording medium can be prevented from being damaged when an external or foreign object hits against the case. The recording medium is accordingly protected in the casing space. Moreover, the casing space is formed in the casing region in the board element, and the casing region is set in size and shape correspondingly to the recording medium, so that the recording medium in the casing space does not easily shift from or move out of the casing space due to vibration or tilting applied to the case. Furthermore, the casing space is open by use of a customary means, for example, by forming a slit or a cut on the sheet member or by forming non-adhering region between the sheet member and the board element, so that the recording medium may be put into or taken out of the casing space through the opening. The recording medium is cased in the casing space being open as above and is surely kept in the cased state without easily slipping off the casing space due to the vibration or tilting applied to the case, and the recording medium can be readily taken out of the casing space through the opening.

The case according to the present invention is fixed to an article, such as a book, with at least the opening of the casing space being covered by folding a cover, which is connected to at least either of the board element and the sheet member, or the board element having the sheet member adhered thereon. In the state that the case is fixed to the article, as above, with the recording meidum being put into the casing space, the recording medium does not slip off the casing space responsive to the vibration or tilting thanks to the feature of the opening being covered and is surely held in the casing space. Hence, the articles can be simply or easily handled, and the case may be disconnected from the articles to allow the recording medium in the casing space to be readily taken out.

A case for casing recording media according to further invention comprises:

a board element which has an area larger than a planar shape of a recording medium to be cased and includes a plurality of casing regions for the recording media; and a sheet member adhered to a surface of one side of the board element at predetermined residual regions located externally of the casing regions, wherein a plurality of casing spaces are formed between the board element and the sheet member correspondingly to the plurality of casing regions, and each casing space is open for allowing the recording medium to pass; and the case with the board element adhered to the sheet member being folded at a folding section between the casing regions is fixed to an article at one lateral side of the case including at least one end of the board element located externally.

According to the invention, the board element folded and the sheet member adhered to the board element define the casing spaces which the recording media can be repeatedly put into and taken out of. When the recording medium is cased in the casing space, there exists at the outside of the periphery of the recording medium the residual region of the board element located externally of the casing region. Hence, the recording medium cased in the casing space is prevented from being hit to be damaged by a foreign or external object which and when hits against the case. Besides, the recording medium when cased in the casing space is covered at a surface of one side with the board element and at the other side surface with the sheet member, so that the recording medium can be prevented from being damaged when an external or foreign object hits against the case. The recording medium is accordingly protected in the casing space. Moreover, the casing space is formed in the casing region in the board element, and the casing region is set in size and shape correspondingly to the recording medium, so that the recording medium in the casing space does not easily shift from or move out of the casing space due to vibration or tilting applied to the case. Furthermore, the casing space is open by use of a customary means, for example, by forming a slit or a cut on the sheet member or by forming non-adhering region between the sheet member and the board element, so that the recording medium may be put into or taken out of the casing space through the opening. The recording medium is cased in the casing space being open as above and is surely kept in the cased state without easily slipping off the casing space due to the vibration or tilting applied to the case, and the recording medium can be readily taken out of the casing space through the opening.

The case according to the present invention which is first folded at the folding section with the recording media being put into the casing spaces is fixed to an article, such as a book, at one lateral side of the case including one end of the board element. The recording media can be readily taken out through the openings by disconnecting the case from the article to unfold the case or cutting the case at the folding section. Moreover, the casing spaces are kept in the state that exists before the recording media are taken out, so that the recording media can be put into the casing spaces under the same conditions again. Furthermore, the openings may be formed in the direction along the folding section. In the case folded and fixed to the article, the recording media even when partially projects from the casing spaces through the opening are restrained from entirely slipping off the casing spaces and from falling from the case since the recording media are prevented from shifting after abutting against the folding section or at the position where the case is fixed to the article. Moreover, the recording media are protected by the board element and the sheet member to thereby be prevented from being damaged.

A case for casing recording media according to a modification of those invention is provided in the casing region with a recess extending away from the sheet member with respect to the residual region.

According to the invention, the recess is formed in the casing region to provide a concave. The recording medium is cased in the casing space to be fit or caught in the concave. The recording medium fit or caught in the concave is restrained from shifting by a peripheral wall surrounding the concave, so that the recording medium is stably cased in the concave. By this feature, the recording medium even when subjected, for example, to vibration does not peel the sheet member from the board element, and durability of the case is improved thanks to the peripheral wall of the concave. Besides, the recording medium is prevented from sliding on the board element and the sheet member and thereby being damaged.

A case for casing recording media according to a further modification of those invention includes the sheet member which is provided to cover the whole of a surface of one side of the board element, be adhered thereto at the residual region exclusive of the casing region, and be provided with the opening.

According to the invention, the sheet member covers the whole of the surface of one side of the board element to allow the recording medium to be surely held in the casing space. Besides, the sheet member is adhered to the board element at its residual region located externally of the casing region as broadly as possible, thereby having high strength in adhesion. The sheet member is adhered accordingly while provided with the opening, for example, by use of a slit or a cut, so that the recording medium can be readily put into and taken out of the casing space.

A case for casing recording media according to a further modification of those invention includes the board element which has the sheet member adhered thereon is provided at an outer part with a through bore.

According to the invention, a string may be inserted into the through bore to bind the cases, so that the recording media can be readily put in order, classified or sorted out. The through bore may be formed on the outer parts of the board element at both sides of the folding section, so that the cases can be bound with gateways provided by the openings being placed at the upside so as to prevent the recording media from easily moving out of the casing spaces.

A case for casing recording media according to further invention comprises:

a board element which has an area larger than a planar shape of a recording medium to be cased;

a sheet member which is laid on the board element to form a casing space for casing a recording medium, is adhered to the board element at a part surrounding the casing space, and is provided with a gateway which communicates with the casing space at a point near the same to allow the recording medium to be put into and taken out of the casing space; and a cover which connects with at least one of the board element and the sheet member and is laid on the sheet member to cover at least a part of the gateway, and is further adapted to be fixed on the board element at a part nearer its peripheral side than the casing space and the gateway in which state the recording medium cannot be taken out of and put into the casing space through the gateway, and moreover adapted to be able to be torn at the fixing position of the cover on the board element or be separated from the board element and the sheet member, wherein the case is fixed to an article at the fixing position of the cover on the board element.

According to the invention, the board element larger in area than the recording medium and the sheet member adhered to the board element define the casing space which is provided with the gateway to be open. The recording medium can be put into and taken out of the casing space through the gateway repeatedly. When the recording medium is cased in the casing space, there exists at the outside of the periphery of the recording medium the residual region of the board element located externally of the casing region. Hence, the recording medium cased in the casing space is prevented from being hit to be damaged by a foreign or external object which and when hits against the case. Besides, the recording medium when cased in the casing space is covered at a surface of one side with the board element and at the other side with the sheet member, so that the recording medium can be prevented from being damaged when an external or foreign object hits against the case. The recording medium is accordingly protected in the casing space. Moreover, the casing space is formed in the casing region in the board element, and the casing region is set in size and shape correspondingly to the recording medium, so that the recording medium in the casing space does not easily shift from or move out of the casing space due to vibration or tilting applied to the case. Furthermore, the casing space is open by use of a customary means, for example, by forming a slit or a cut on the sheet member or by forming non-adhering region between the sheet member and the board element, so that the recording medium may be put into or taken out of the casing space through the opening. The recording medium is cased in the casing space being open as above and is surely kept in the cased state without easily slipping off the casing space due to the vibration or tilting applied to the case, and the recording medium can be readily taken out of the casing space through the opening.

There is further provided the cover which connects with either the board element or the sheet member, or at least either thereof and covers at least a part of the gateway. When the cover is fixed on the board element, for example, by fixing the board and the cover to an article, the recording medium cannot be put into or taken out of the casing space through the gateway. Thus, in the state that the case is fixed to the article, the recording medium cased in the casing space does not move out of the casing space through the gateway, thereby being prevented from falling from the case and providing the effect of preventing burglaries. Besides, the cover may be torn at the fixing position of the cover on the board element or separated from the board element and the sheet member, so that the recording medium placed in the casing space can be readily taken out. The cover may comprise an additionally provided member smaller in size than the board element, or the board element folded to serve as the cover.

BRIEF DESCRIPTION OF THE DRAWINGS

FIG. 16 is a front view showing a case 250 for casing recording media in a further modified example according to the present invention.

FIG. 17 is an enlarged perspective view of the cut 70 and the part around the same.

DETAILED DESCRIPTION OF THE PREFERRED EMBODIMENT

Figure 1:
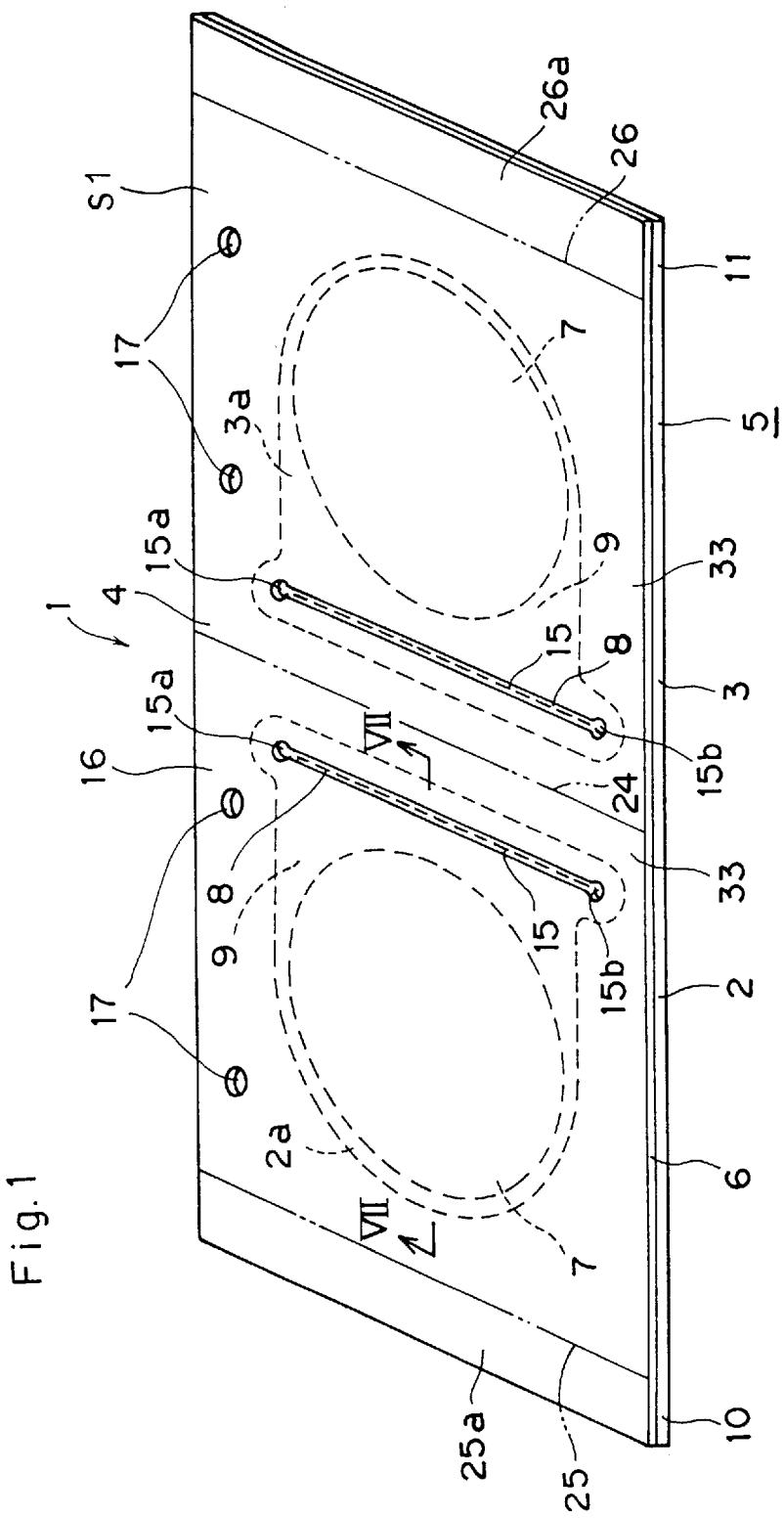
FIG. 1 is a perspective view of a case 1 for casing recording media, being unfolded for explanation, used for a casing structure of a disc-like shaped recording medium into books in an example according to the present invention

FIG. 1 shows a case 1 for casing recording media, being unfolded for explanation, in an example according to the present invention. For convenience of illustration and explanation, thickness of the case is enlarged in the drawing. The case 1 unfolded is rectangular and provided for casing recording media, i.e., a compact disc 7 (called hereunder the "disc"). The case 1 comprises two boards 2, 3 larger in area than the planar shape of the disc 7. The boards 2, 3 are formed by adhering a film 6, which serves as the sheet member and has light transmission properties, onto a surface of one side of a board material 5 rectangular when unfolded.

Figure 2:
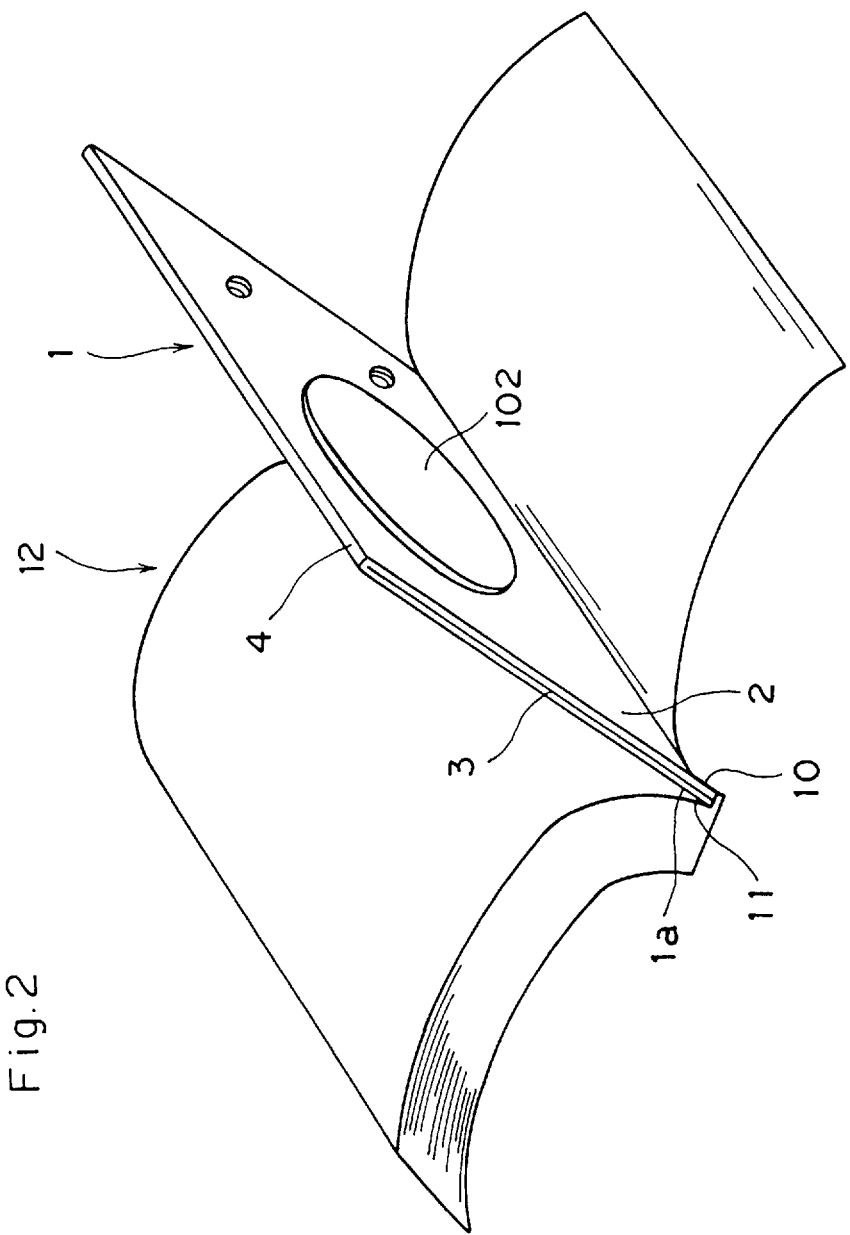
FIG. 2 is a perspective view of the case 1 fastened in a book 12.

In this example, the film 6 covers the whole of that one side surface of the board material 5 and is adhered thereto at a residual region S1 (see FIG. 3) extending around the outer peripheries of casing regions 2a, 3a larger in area than a surface of one side of the disc 7 (a planar shape thereof). The board material 5 and film 6 define a casing space 9 for the disc 7 which casing space 9 corresponds to the casing regions 2a, 3a of the boards 2 and 3. The casing space 9 has an entrance or a gateway 8 for the disc 7 through which the disc passes. The case 1 is, as shown in FIG. 2, folded at a folding section 4 between the casing regions 2a and 3a with the film 6 being placed inside and both ends 10 and 11 being matched, which ends 10, 11 are nearer the peripheral part of the board material 5 than the casing space 9 and gate way 8 and have the intervening folding section 4. And the folded case 1 is bound in an article, i.e., a book 12, such as monthly or weekly magazines, at one lateral side 1a including both ends 10, 11. In this situation, one of the boards 2 and 3 serves as a cover for the other.

As seen, the board material 5 and the film 6 adhered thereon form the casing spaces 9 at the boards 2 and 3 with the gateways 8 near the folding section 4, so that the disc 7 can be cased in each casing space 9. The case 1 is folded, with the disc 7 being cased therein and both ends 10 and 11 being matched to each other, and fastened in the book 12, so that the discs 7 can be included in the book, for example, as an appendix or a supplement. The discs 7 may be readily taken out through the gateways 8 after the case 1 is torn and removed from the book 12 to be unfolded or is cut at the folding section 4. After taking out the discs 7, they may be cased again in the casing spaces 9 under the same conditions since the casing spaces 9 are kept intact after the discs are taken out.

The gateways 8 of the casing spaces 9 are formed at the side of or near the folding section 4. Hence, in the case 1 folded in two and bound in the book 12, the discs 7 when shifted in the casing spaces 9 abut against the folding section 4 to be stopped in shifting. By this feature, the discs 7 even when partially project from the gateways 8 are prevented from entirely moving out of the casing spaces 9 or falling from the casing 1. Thus, to take out the discs 7, the case 1 needs to be torn and removed from the book 12 or cut at the folding section 4, as aforesaid. This provides an effect of preventing the discs 7 from being stolen. Moreover, the case 1 folded in two has the board element 5 at the outside and the film 6 inside to form the casing spaces 9. The case 1 bound in the book 12 allows the discs 7 to be protected by the board material 5 and be unlikely damaged. Furthermore, since the film 6 has light transmission properties, it provides such advantage and convenience that the discs 7 cased in the casing spaces 9 can be seen through the film 6.

Figure 3:
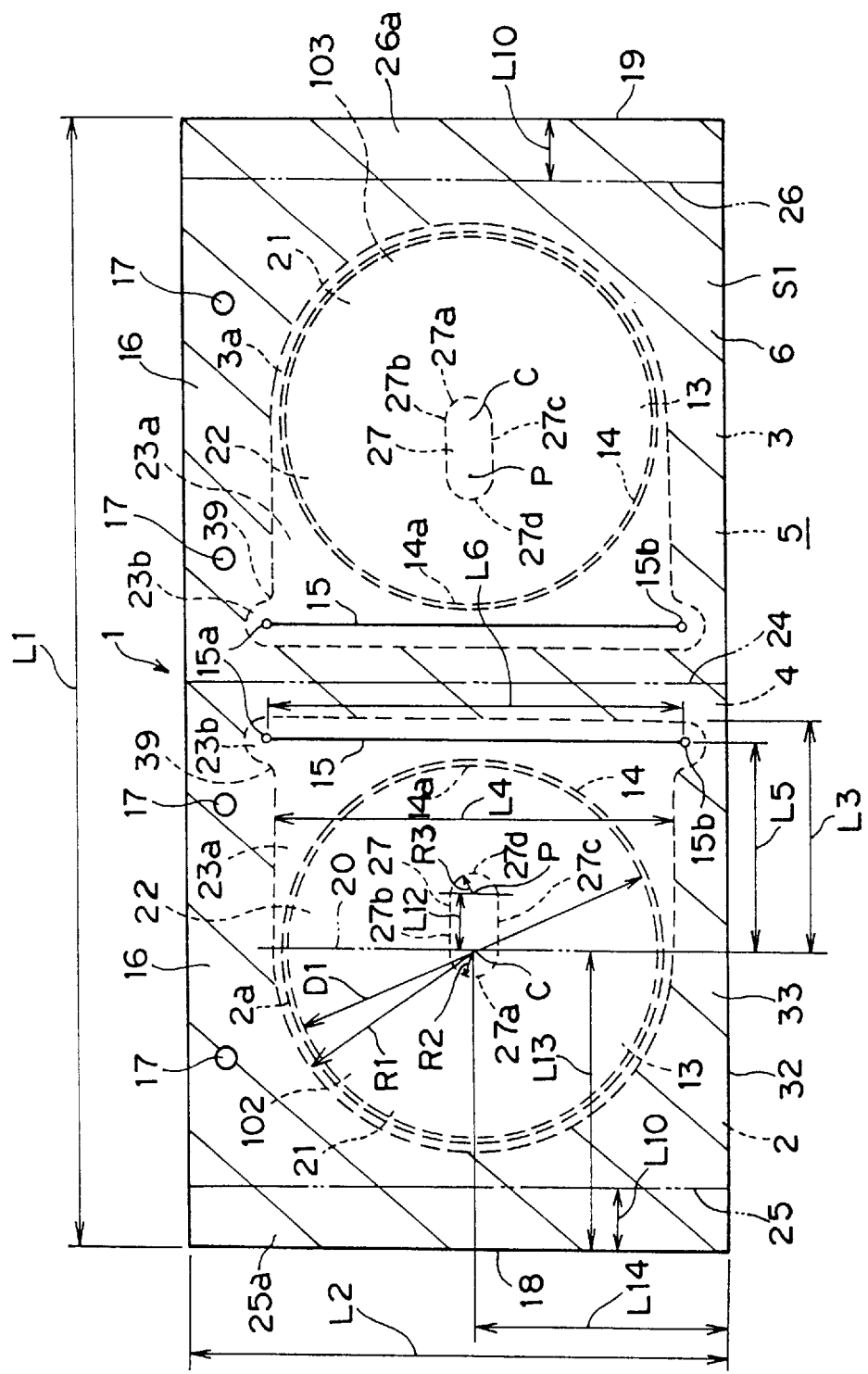
FIG. 3 is a front view of the case 1 being unfolded.
Figure 4:
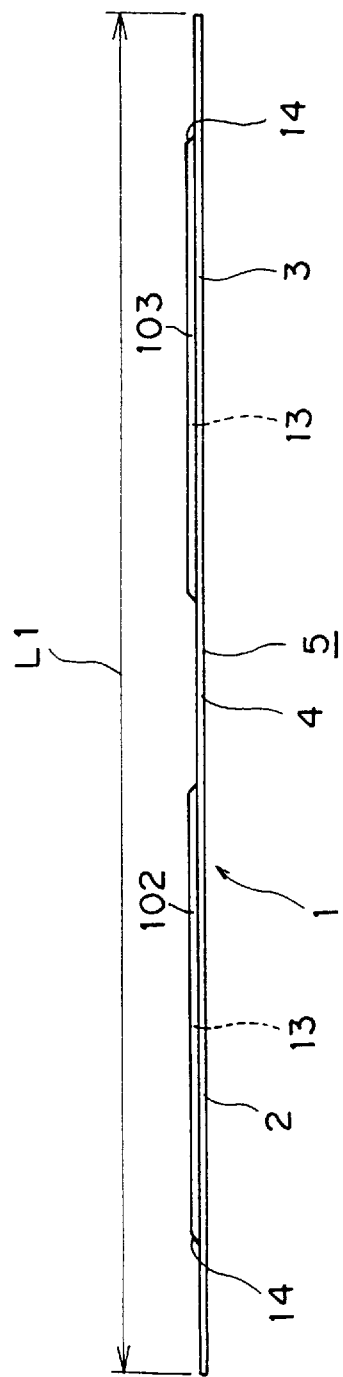
FIG. 4 is a plan view of the case 1 shown in FIG. 3.
Figure 5:
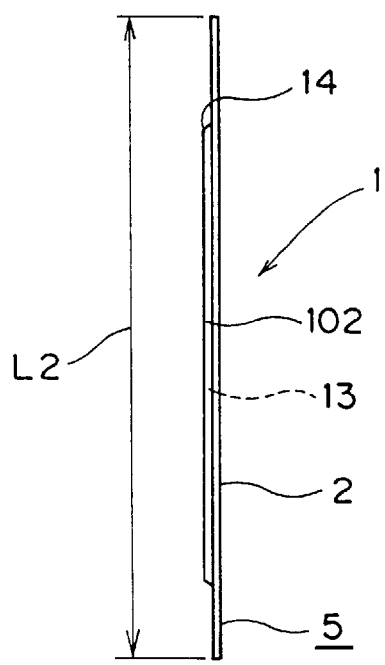
FIG. 5 is a left side view of the case 1 shown in FIG. 3.
Figure 6:
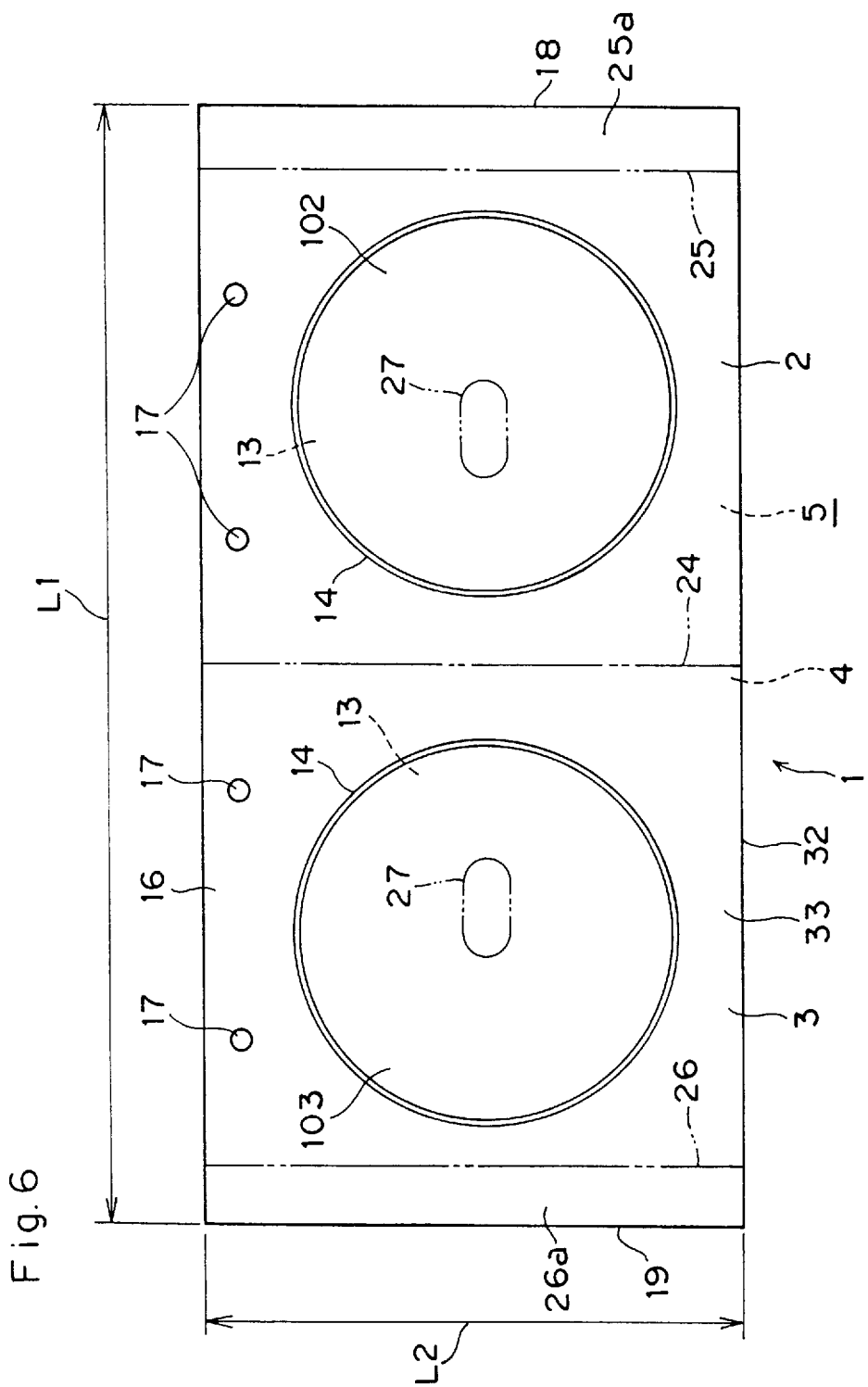
FIG. 6 is a rear view of the case 1 shown in FIG. 3.
Figure 7:
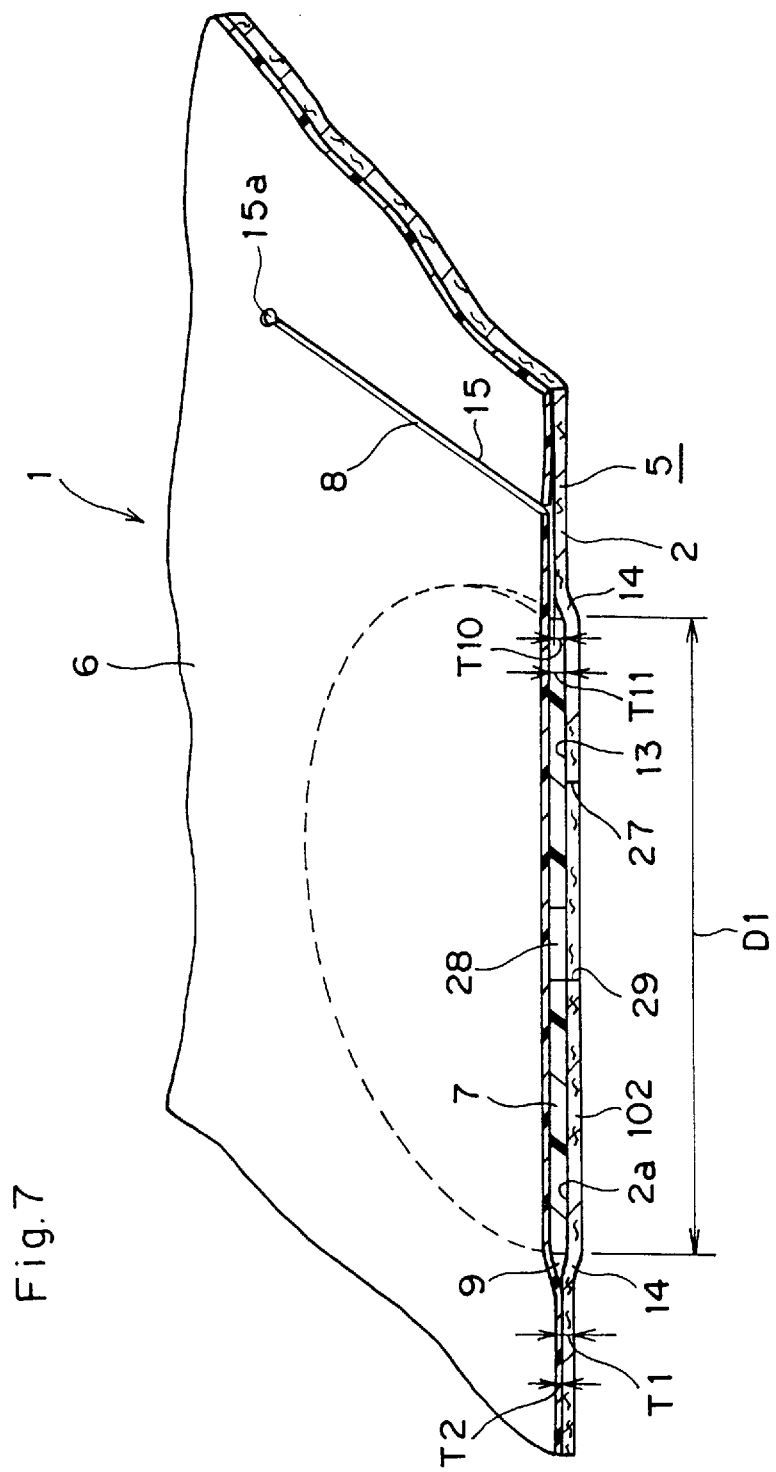
FIG. 7 is a perspective sectional view of the case 1 taken in the line VII—VII in FIG. 1.

FIG. 3 is a front view showing the case 1, FIG. 4 a plan view of the same, FIG. 5 a left side view of the same and FIG. 6 a rear view of the same. Illustration is omitted on a right side view of the case 1 which is the symmetrical counterpart of the left side view, and also on a bottom view of the case 1 that is the same as the plan view. For convenience of illustration, thickness of the film 6 is not shown. FIG. 7 is a perspective and partially enlarged sectional view taken in the line VII—VII in FIG. 1 and is magnified in thickness of the case for convenience of illustration. FIGS. 1 and 2 are also referred to. The case 1 has in the casing regions 2a, 3a of the boards 2, 3 recesses 102, 103 in specific positions corresponding to the discs 7 to be cased, which recesses 102 and 103 are concaved to be apart from the film 6 so as to be convex to the outside when the case 1 is folded in two, whereby providing round concaves 13 having the substantially same inner diameters as the outer diameters of the discs 7. Depth T10 of the concaves 13 is smaller than thickness T11 of the disc 7.

The concaves 13 are formed on the boards 2, 3 as above. The discs 7 when cased in the case 1 are fit in the concaves 13 to be prevented from shifting radially by a peripheral wall 14, which extends circumferentially of and around the concaves 13 on the board material 5, and also prevented from shifting axially by the film 6. Hence, the discs 7 even when subjected, for example, to vibration are held stably in the concaves 13. By this feature, it is unlikely that the discs 7 shift in any way in the casing spaces 9 to push the film 6 and cause the same to peel off from the board material 5. Besides, durability of the case 1 is improved. And it is also prevented that the discs 7 are unexpectedly slided on the board material 5 or the film 6 by vibration, as above, to damage surfaces of the discs 7.

The film 6 is applied to cover the whole inner surfaces of the boards 2 and 3 on which inner surfaces the casing spaces 9 are formed, i.e., the whole of a surface of one side of the board material 5 which one side surface is positioned inside of the board material 5 when folded in two. And the film 6 is adhered to the board material 5 around the whole peripheris of the casing spaces 9, i.e., in the residual region S1 of the board material 5 exclusive of the casing regions 2a, 3a. The film 6 has a slit or a cut 15 serving as the gateway 8 for the discs. In more detail, the board material 5 may use a paperboard, such as "double-side ivory coated" board, rectangular in shape and about 0.28 to 0.32 mm in thickness T1. The film 6 may use a synthetic resin material, such as polypropylene, about 0.05 mm in thickness T2 to cover the whole of that one side surface of the board material 5. Applied to the board material 5 in the residual region S1 indicated in FIG. 3 by slanted lines is an adhesive of synthetic resin, for example, the series of vinylchloride to adhere the film 6 to the board material 5. Generally, paper and polypropylene have excellent affinity in adhesion. The board material 5 consisting of a paperboard and the film 6 of polypropylene are superior in mutual adhering efficiency and readily or easily workable to adhere to each other.

As seen, the film 6 covers the whole inner surfaces of the boards 2 and 3, on which inner surfaces the casing spaces 9 are provided, i.e., the whole of the surface of the board material 5 at one side with respect to its thickness which surface is positioned inside of the board material 5 when folded in two. Hence, the discs 7 are surely held in the casing spaces 9. And the film 6 is adhered around the whole peripheries of the casing spaces 9 as widely or broadly as possible, thereby having high adhesion on the board material 5. Although the film 6 is adhered to the board material 5 as above, the film 6 has the slit or cut 15 serving as the gateway 8 through which the discs 7 are readily put into and taken out of the casing spaces 9.

The casing 1 has through bores 17 which extend through the board material 5 and film 6 and are adjacent to the casing spaces 9 and located at an outer part 16 continued to the folding section 4. In this example, each board 2, 3 has two through bores 17 in which a string or a cord may be inserted to bind or gather the board material 5 or the case 1, enabling the discs to be simply put in order, classified or sort out. In addition, since the through bores 17 are formed in the outer part 16 continuedto the folding section 4, the board material 5 may be bound or gathered together as aforesaid, so that the gateways 8 may be positioned at the upside to prevent the discs 7 from easily moving out of or escaping from the casing spaces 9. Moreover, since the through bores 17 are formed in each board 2, 3, convenience is improved as that the board material 5 may be cut at the folding section 4 to bind or gather the boards 2 and 3 separately. The casing 1 has perforation including perforated lines 25, 26 consisting of dotted line-shaped lines of apertures, as indicated by a phantom lime, at both ends 10, 11 apart from both edges 18, 19 at an interval L10 of about 20 mm (FIG. 3), so that the case 1 may be readily torn at the perforated lines 25, 26. The case 1 when bound or fastened in the book 12, as shown in FIG. 2, by means of outer parts 25a, 26a extending outwardly over the perforated lines 25, 26 can be cut at the perforated lines 25, 26. The cut boards having the casing spaces 9 may be unfolded to allow the discs 7 to be readily taken out.

The case 1 has also at the folding section 4 a perforated line 24, as indicated by a phantom line, placed centrally between the edges 18 and 19. The perforated line 24 allows the case 1 to be readily folded at the folding section 4 and thereby easily workable to be bound or fastened in the book 12, and also the case 1 to be readily cut along the perforated line 24 so that the case 1 when bound or fastened in the book 12 may be cut at the perforated line 24 to allow the discs 7 to be readily taken out.

Figure 8:
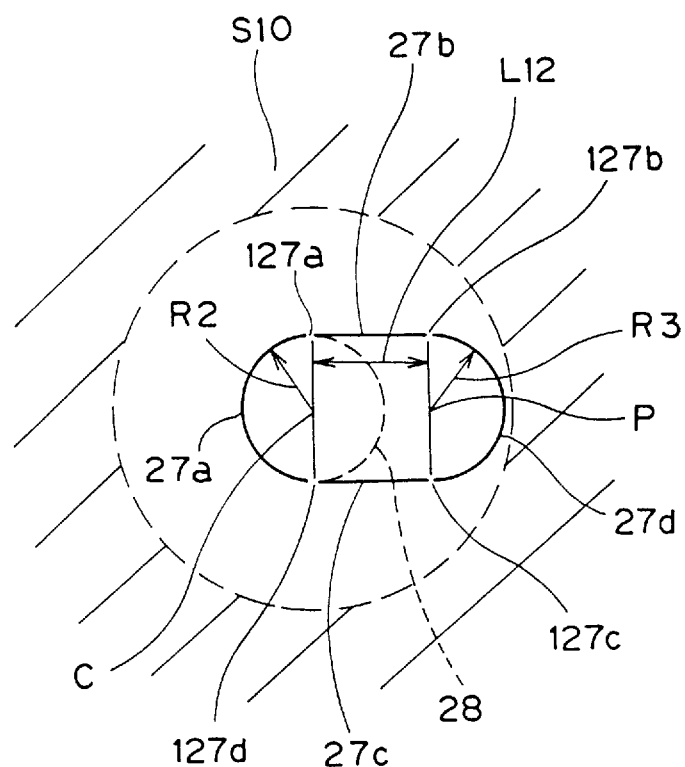
FIG. 8 is an enlarged rear view showing the cut-into section 27 shown in FIG. 6 and the part around or near the same.

FIG. 8 is an enlarged rear view of a cut-into section 27 and the region around the same formed on the boards 2, 3 shown in FIG. 6. The cut-into section 27 substantially elliptical in shape, as indicated by a phantom line in FIG. 6, is formed in the case 1 almost centrally of the recesses 102, 103 in the casing regions 2a, 3a of the boards 2 and 3.

The cut-into section 27 makes a closed loop comprising a plurality (four in this example) of connecting parts 127a, 127b, 127c and 127d and a plurality of cut-into parts 27a, 27b, 27c and 27d each extending among the connecting parts 127a–127d, the cut-into parts being long peripherally of the closed loop. FIGS. 3 and 7 are also referred to here. The cut-into section 27 corresponds in position to a central insertion hole 28 of the discs 7 when cased in the casing regions 9, and is elongated toward the folding seciton 4. In more detail, the cut-into section 27 includes the arcuate cut-into part 27a which has a radius R2, extended from the same center C as the concave 13, of about 7.5 mm almost equal to that of the disc's insertion hole 28; straight cut-into parts 27b and 27c which extend at an interval L12 of about 13 mm almost in parallel to each other from the connecting parts 127a and 127d at both ends of the arcuate cut-into part 27a toward the folding section 4; and the arcuate cut-into part 27d which extends between the connecting parts 127b and 127c positioned at opposite ends of the straight cut-into parts 27b, 27c to those at the side of the arcuate cut-into part 27a and has a radius R3 of about 7.5 mm extended from a central point P which is apart at the same interval as that L12 from the recess's center C toward the folding section 4. The cut-into sections 27 on the boards 2, 3 are symmetrical with respect to the folding section 4. In FIG. 3, indication of sizes is made only for the cut-into section 27 of the board 2 but omitted for that of the board 3 for convenience of illustration.

By the above feature, the board material 5 may be readily cut along the cut-into sections 27. The cut-out section 27 is separated from the board material 5 to simply form a guide bore 29 substantially elliptic as aforesaid on the boards 2 and 3. The guide bore 29 allows users to insert the forefinger into the guide bore 29 and then the insertion hole 28 of the disc 7 for readily shifting the disc 7 along the guide bore 29 to cause a part of the disc 7 to project from the gateway 8 so that the disc 7 may be easily taken out of the casing space 9.

The cut-into sections 27 which are sized as aforesaid do not correspond or face to a recording region S10 in the discs 7 put into the casing spaces 9, the recording region S10 being indicated by slanted lines in FIG. 8. Hence, when the guide bore 29 is formed by cutting out the cut-into section 27, the recording regions S10 of the discs 7 do not project outwardly or are not exposed to the outside, whereby they are prevented from being damaged. Moreover, the number of the connecting parts 127a–127d may be lessened with the cut-into parts 27a–27d are made longer. By this feature, when user tears with the fingers and cuts apart or breaks the cut-into sections 27 and even if a part of the connecting parts 127a–127d remains on the board 2 or 3 to project into the casing spaces 9, such possibly residual connecting parts are less. Hence, the discs 7 when put into and taken out of the casing spaces 9 are prevented from being largely damaged and have practically no fear of being damaged.

The case 1 when unfolded as foregoing is rectangular in shape; about 360 mm in length L1 at the longer or longitudinal sides of the rectangle with the folding section 4 in the middle thereof, and about 172 mm in length L2 at the shorter sides extending widthwise of the rectangle and perpendicularly to the longer sides; and has on the boards 2 and 3 the concaves 13 each of which is circular around the center C which is apart at an interval L13 of about 95 mm from each edge 18, 19 opposite to the folding section 4 and also apart at an interval L14 of about 80 mm from an edge 32 of an outer part 33 opposite to the outer part 16 having the through bores 17. A peripheral wall 14 defining the concaves 13 extends slantwise and radially outwardly as becoming larger in diameter as approaching the film 6 placed inside the board material 5 folded in two. An inner diameter D1 of the peripheral wall 14 at its part of a smallest diameter is set to be about 120 mm almost equal to the outer diameter of the discs 7. By this, the discs 7 can be cased stably, and the discs are readily taken out by being guided with the slanted peripheral wall 14. The concaves 13 on the boards 2 and 3 are symmetrical with respect to the folding section 4. In FIG. 3, indication of sizes is made only for the concave 13 on the board 2 but omitted for that on the board 3 for convenience of illustration.

The casing spaces 9 are in a generally U-like shape as shown in FIG. 3, and comprises a semi-circular section 21 which has a radius R1 of 63 mm from the center C of the concaves 13 and is far from the folding section 4 with respect to a phantom line 20 extending widthwise of the case 1 through the center c. Another section 22 near the folding section 4 with respect to the phantom line 20 extends at an interval L3 of about 83 mm from the semicircular section 21 toward the folding section 4 and includes an extended part 23 which has a width L4 of about 126 mm and extends from the phantom line 20 to a point 39 near an area 14a of the peripheral wall 14 nearest the folding seciton 14, and a wider section 23b which is located near the folding section 14 and wider than the width L4 and has the slit or cut 15 about 130 mm in length L6 at a point apart at an interval L5 of about 65 mm from the phantom line 20. The casing spaces 9 in the boards 2 and 3 are symmetrical with respect to the folding section 4. In FIG. 3, indication of sizes is made only for the casing space 9 in the board 2 but omitted for that in the board 3 for convenience of illustration.

The casing spaces 9 having the shape and sizes formed as above allow the discs 7 about 120 mm in outer diameter and about 1 mm in thickness T11 to be cased in the casing spaces 9 stably without undesirably shifting, be readily inserted into the casing spaces 9 and simply taken out thereof. The slit or cut 15 has arcuate portions 15a and 15b at both ends, so that in case that the film 6 is subjected to tension when the discs 7 are inserted into or taken out of the casing spaces 9, stress corresponding to tension is prevented from concentrating on a specific point, thereby preventing the film 6 from being damaged.

Figure 9:
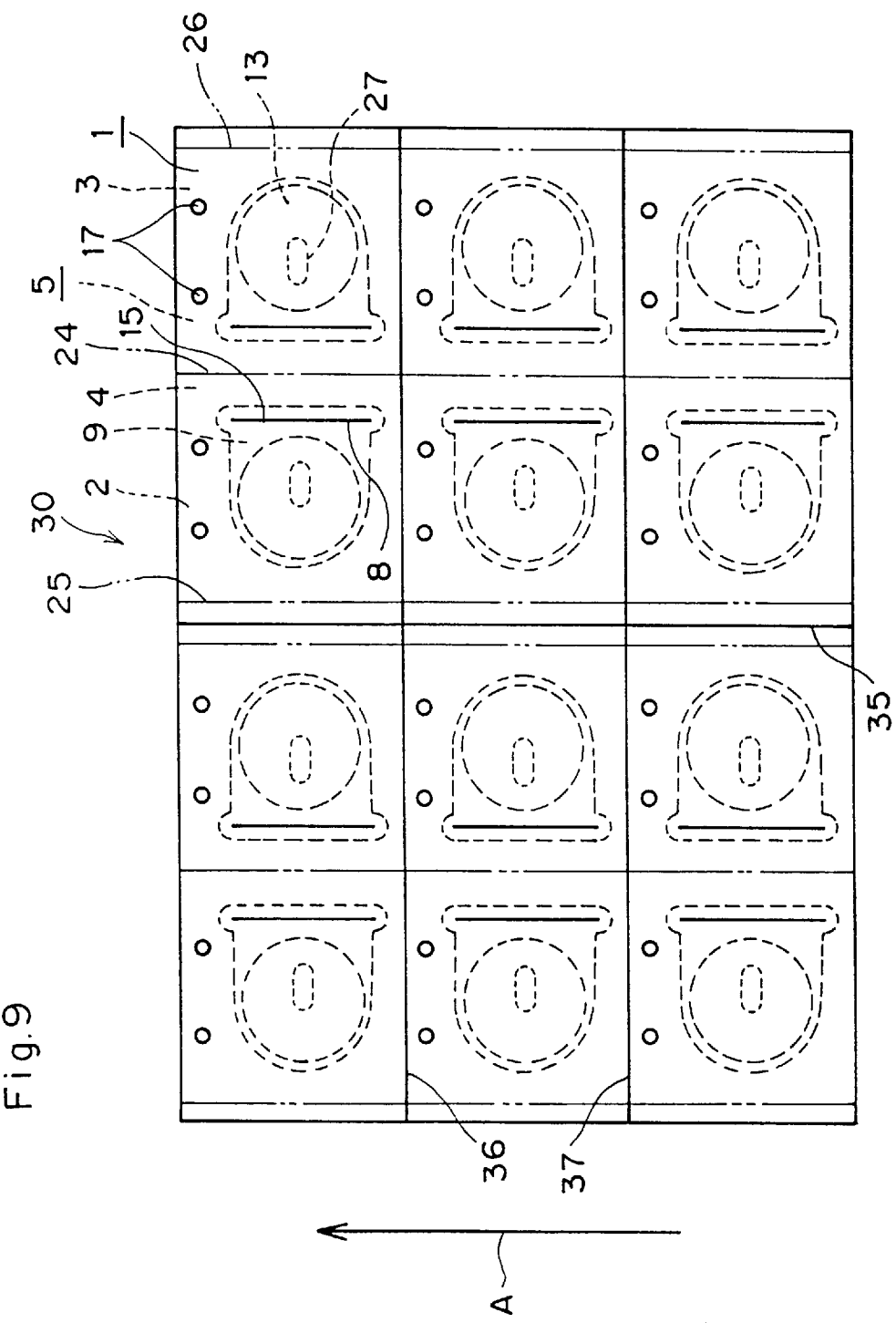
FIG. 9 is a front view showing a plate-like shaped material 30 of which the cases 1 are cut out.

The case 1 is provided by first adhering a film material onto a plate-like shaped material 30, from which a plurality of cases 1 may be formed as shown in FIG. 9, and working the material and then cutting off the cases 1. The plate-like shaped material 30 is a rectangular paper-board coated ivory at both sides as aforesaid. In this example, the plate-like shaped material 30 is sized as substantially corresponding to that six cases 1 are arranged with two in the longitudinal direction of the cases (extending transversely in FIG. 9) and three widthwise of the cases. For convenience of understanding, FIG. 9 illustrates the cases 1 that have been already provided with the casing spaces 9 and other elements.

The plate-like shaped material 30 is worked with one surface, which is assumed upright on the actual surface of FIG. 9 to face the readers, being moved upwards and widthwise of the cases 1 as indicated by the arrow A. In detail, first, the cut-into sections 27 are formed in predetermined positions by pressing that one surface from above, i.e, from this side facing that one surface by use of a punching machine having a Thomson blade. After forming the cut-into sections 27, a press machine is used to press from above the parts where the concaves 13 are to be formed, thereby forming the recesses 102 and 103 to provide the concaves 13 (See FIG. 3).

Figure 10:
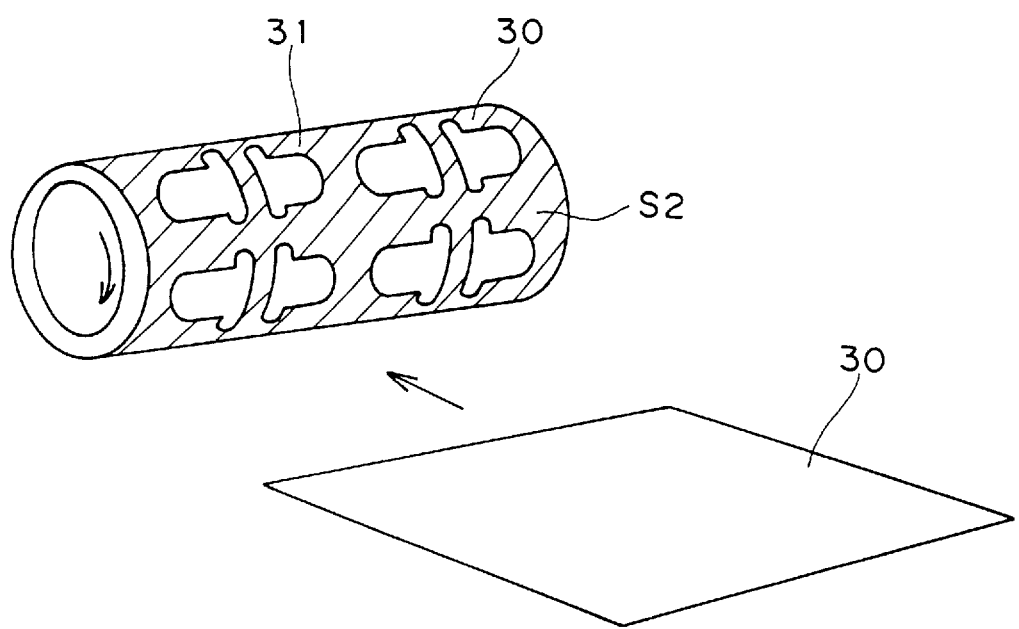
FIG. 10 is a perspective view showing a means for applying an adhesive.

After forming the cut-into sections 27 and the concaves 13, an adhesive is applied to the plate-like shaped material 30 by use of a drum 31, as shown in FIG. 10. An adhesive is previously applied to the drum 31 in the region S2 indicated by the slanted lines corresponding to the foregoing region S1 on the board material 5. The drum 31 is rolled on the plate-like shaped material 30 by use of the principle of offset printing to apply the adhesive on the material 30. During applying the adhesive on the material 30 by the drum 31, a film material (not shown), for example, prepared in rolls and having a shape and sizes corresponding to the plate-like shaped material 30, is fed onto and adhered to the material 30. Accordingly, the cut-into sections 27 are formed only on the board material 5 but not the film, and the concaves 13 are easily formed without damaging the film 6 by a pressing force which is for forming the concaves 13. In addition, use of the drum 31 enables the adhesive to be easily applied to desired positions, makes simple the adhesive-applying work and allows time necessary for the work to be shorter.

After adhering the film material to the plate-like shaped material 30, a punching machine provided with a straight blade part, a small circular blade part and a Thomson blade is used to form the slit or cut 15 on the film material at a predetermined position for the gateway 8 by use of the straight blade part, the through bores 17 by the small circular blade part, and the perforated lines 24–26 by the Thomson blade. The plate-like shaped material 30 is then cut in the lines 35, 36 and 37 into the six cases 1. By the above feature, the board material 5 with the film 6 are given the perforated lines 24–26 for enabling the cases 1 to be cut easily along the perforated lines. The above procedure for forming the cases 1 enables a number of cases 1 to be provided simply and quickly and allows cost to produce per case to be lowered.

Figure 11:
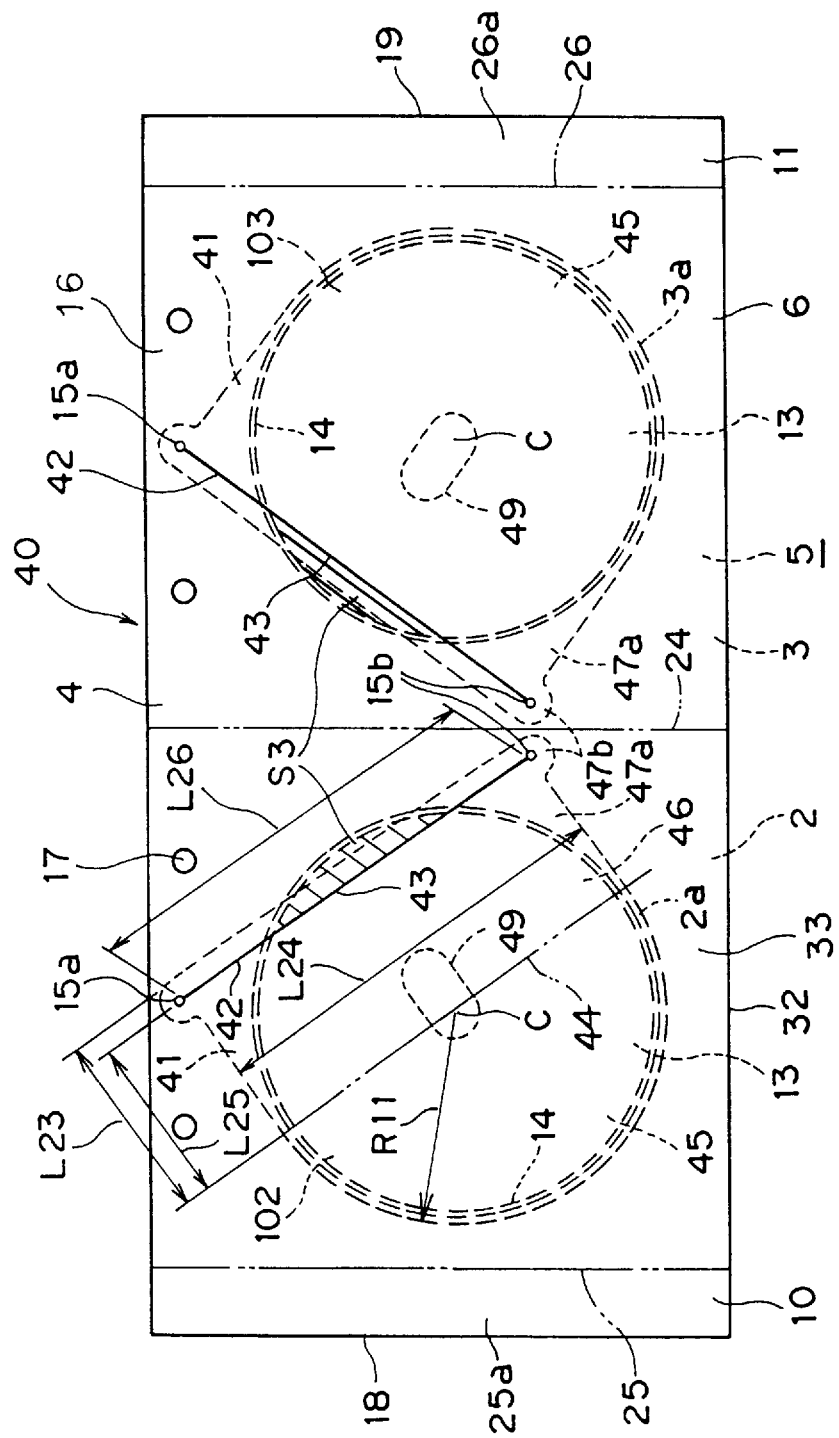
FIG. 11 is a front view showing a case 40 for casing recording media, being unfolded for explanation, in a modified example according to the present invention.

FIG. 11 is a front view showing a case 40 for casing recording media, being unfolded, according to one of other examples of the present invention. The case 40 is similar in structure to the case 1 referred to in the above example. Explanation will be given only on a different feature from the case 1 but not on the same structures as those of the case 1 for which the same reference numerals are put.

Casing spaces 41 are formed instead of the casing spaces 9 provided in the case 1. The casing spaces 41 in the case 40 are generally U-like shape, and gateways 42 are each formed at the side of the folding section 4 near the outer part 16 on which the through bores 17 are formed. The gateways 42 consist of a slit or cut 43 which extends in the direction of approaching the outer part 16 as extending from the side of the folding section 4 toward the ends 10, 11. In the casing spaces 41, a part 45 opposite to the slit or cut 43 with respect to a phantom line 44, which line 44 extends through the center C of the concave 13 and is parallel to the slit or cut 43, has a radius R11 of 63 mm to be semicircular. The other part 46 nearer the slit or cut 43 with respect to the phantom line 44 extends at an interval L23 of about 40–55 mm from the semicircular part 45 toward the folding section 4 and the outer part 16, i.e., toward the slit or cut 43, and includes an extended part 23 which has a width L24 of about 126 mm and a wider section 47b which is located most far from the phantom line 44, similar to the foregoing wider part 23b (FIG. 3) and wider than the width L24 and has the slit or cut 43 about 130 mm in length L26 at a point apart at an interval L25 of about 35–54 mm from the phantom line 44. According to the feature, cut-into sections 49 in stead of the cut-into sections 27 are formed to extend from a point corresponding to an insertion hole of the discs 7 toward the slit or cut 43 substantially perpendicularly thereto. The cut-into sections 49 are in shape of the cut-into sections 27 being displaced angularly around the center C, and not referred to minutely here. Indication of sizes is omitted for the casing space 41 in the board 3 which corresponds to that in the board 2.

When the discs 7 are cased in the casing spaces 41 of the case 40, a part of the disc 7 projects from the casing space 41 through the gateway 42 into the region S3 indicated by the slanted lines. The case 40 provides the same effects as of the foregoing case 1, and the discs 7 when put into the casing spaces 41 project partially from the gateways 42 so that the discs 7 can be easily taken out of the casing spaces 41. The case 40 may be bound or fastened in a book 12 with the outer part 16 having the through bores 17 being arranged at the upside, so that the discs 7 which partially projects from the gateway 42 are nevertheless hard to be moved out of the casing space 41 undesirously.

Figure 12:
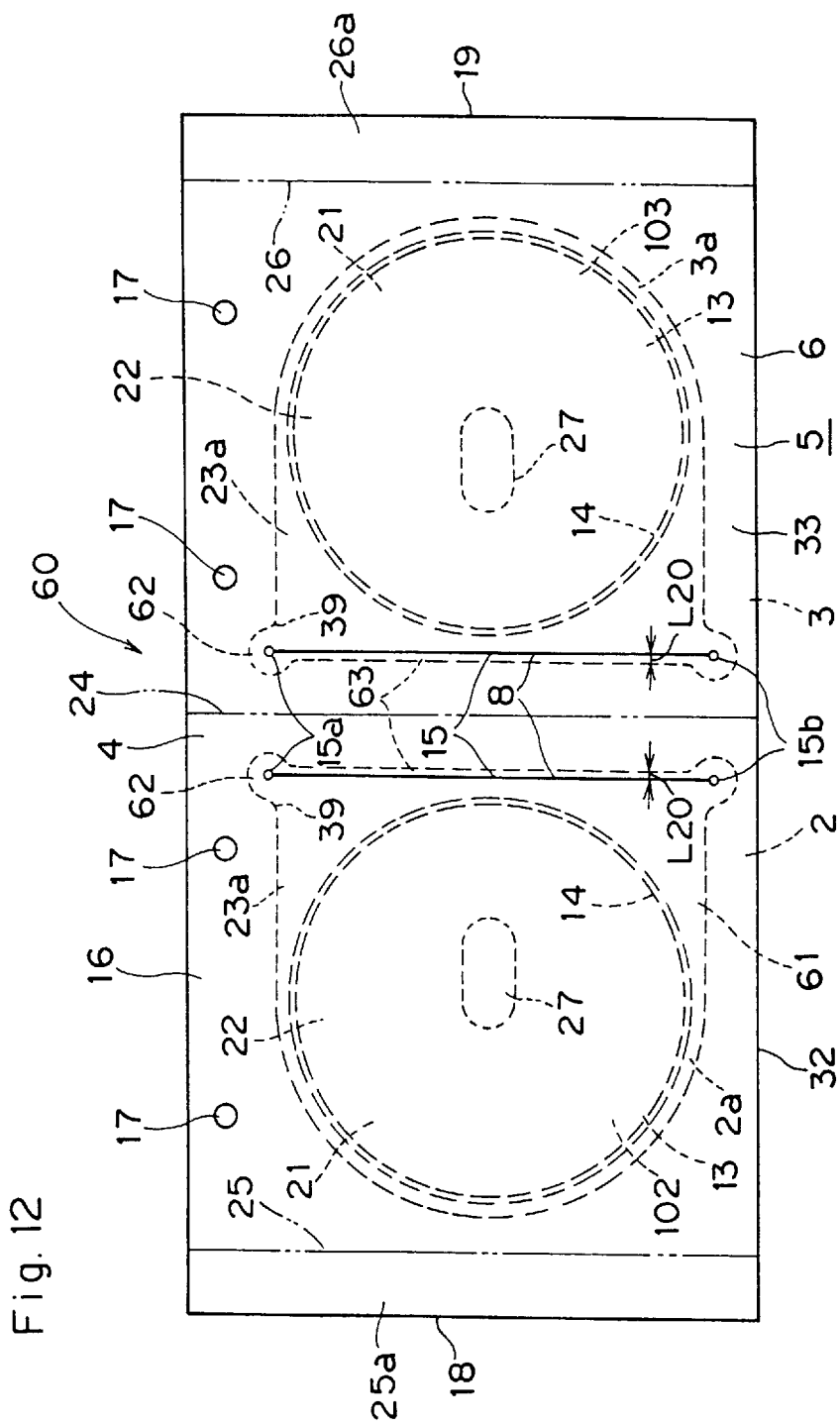
FIG. 12 is a front view showing a case 60 for casing recording media, being unfolded for explanation, in a further modified example according to the present invention.

FIG. 12 is a front view showing a case 60 for casing recording media, being unfolded, according to a further one of modified examples of the present invention. The case 60 is similar in structure to the foregoing case 1. Explanation will be given only on a different feature from the case 1 but not on the same structures as those of the case 1 for which the same reference numerals are put. Casing spaces 61 instead of the casing spaces 9 in the case 1 are formed. A wider part 62 in the casing spaces 61 of the case 60 has a section 63 which is located at the side of folding section 4 with respect to the slit or cut 15 and narrow in width L20, for example, of about 1 mm.

The case 60 provides the same effects as the case 1 and further allows the discs 7 to be readily taken out of the casing spaces 61 without having such defect that the discs 7 when to be taken out of the casing spaces 61 are not moved out of the gateway 8 provided by the slit or cut 15 but are caught between the board material 5 and the film 6 nearer the folding section 4 than the slit or cut 15.

Figure 13:
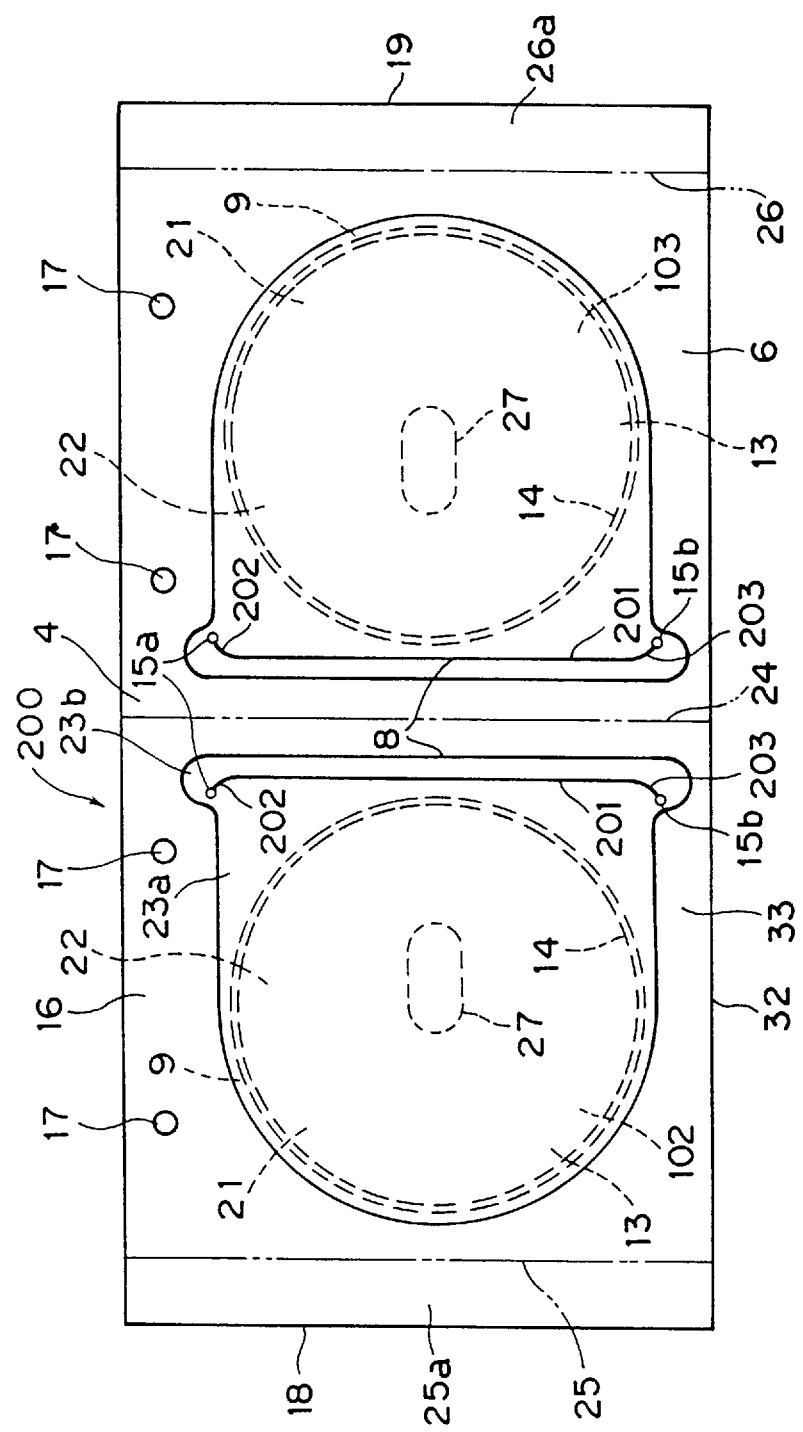
FIG. 13 is a front view showing a case 200 for casing recording media in a further modified example according to the present invention.

FIG. 13 is a front view showing a case 200 for casing recording media, being unfolded, according to a further one of modified examples of the present invention. The case 200 is similar in structure to the foregoing case 1. Explanation will be given only on a different feature from the case 1 but not on the same structures as those of the case 1 for which the same reference numerals are put. In the case 200, a slit or cut 201 instead of the slit or cut 15 in the case 1 is formed and has both end parts 202 and 203 curving toward and approaching the concaves 13.

The case 200 provides the same effects as the case 1 and further allows the gateway 8 to be largely openable by the slit or cut 201, thereby enabling the discs 7 to be readily put into and taken out of the casing spaces 9. Moreover, even when the film 6 is drawn by users with an inadvertent large force for opening the gateway 8, the end parts 202 and 203 at which the slit or cut 201 changes in its extending direction allow the slit or cut 201 to be largely opened in comparison with the straight slit or cut. Hence, the slit or cut 201 formed in the shape as above when opened largely causes stress dispersion to prevent generation of cracks at the slit or cut 201.

Figure 14:
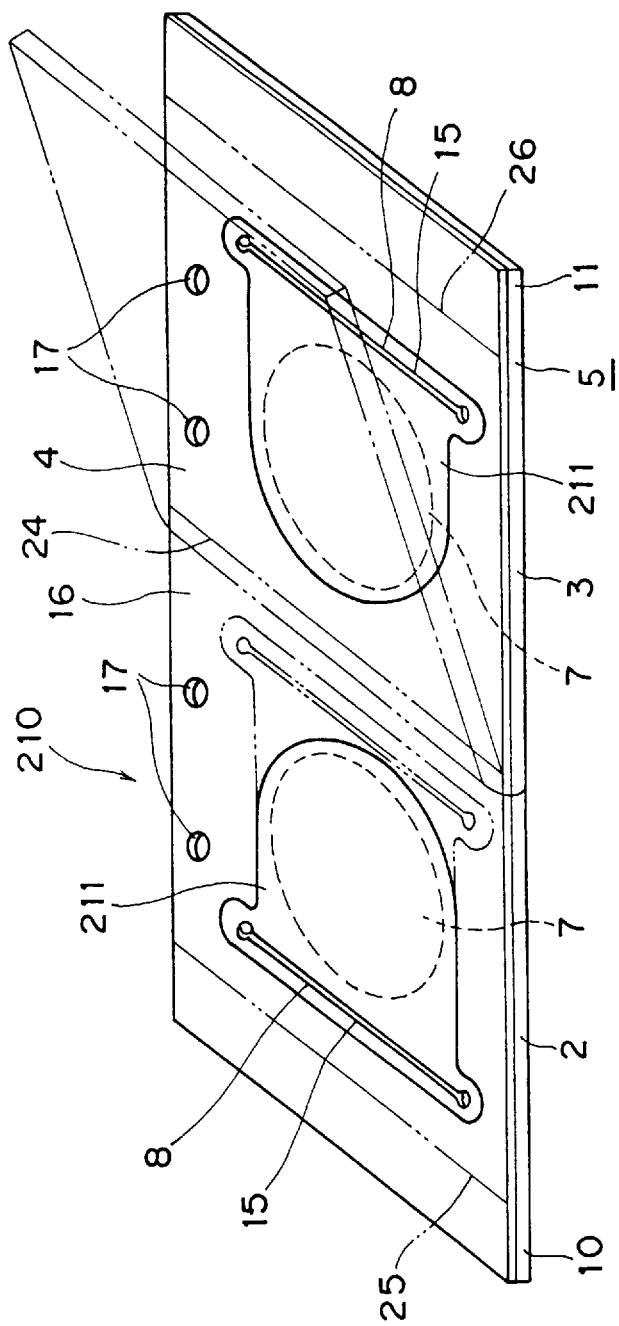
FIG. 14 is a front view showing a case 210 for casing recording media in a further modified example according to the present invention.

FIG. 14 is a perspective view showing a case 210 for casing recording media, being unfolded, according to a further one of modified examples of the present invention. The case 210 is similar in structure to the foregoing case 1. Explanation will be given only on a different feature from the case 1 but not on the same structures as those of the case 1 for which the same reference numerals are put.

In the case 210, casing spaces 211 instead of the casing spaces 9 in the case 1 are formed and have similar structures to the casing spaces 9 but are arranged reversely, as shown, of the casing spaces 9 with respect to a virtual plane including the center C and extending along the folding section 4. The casing spaces 211 has the slit or cut 15 placed near the ends 10, 11 with respect to the concaves. The case 210 is folded at the folding section 14 as shown by a phantom line in FIG. 14 to be bound or fastened in a book 12 with the ends 10 and 11 being matched in the same manner as the case 1. By this feature, when the case 210 is fastened in the book 12, the gateway 8 provided by the slit or cut 15 faces a binding part of the case 210 in the book, so that the discs 7 placed in the casing spaces 211 do not easily slip out of the casing spaces 211, thereby preventing the discs 7 from falling. This also provides an effect of preventing burglaries.

As a modification of this invention, the casing space 9 may be formed on one board 2 as shown by a phantom line in FIG. 14, and the casing space 211 on the other board 3. By this feature, the discs 7 may be put into or taken out of the casing spaces unidirectionally or from the same side, i.e., from the right-hand side in FIG. 14, thereby making simple putting into and taking out operations of the discs 7. The discs 7 do, as a matter of course, not easily fall from the casing space 9 or 211 when the case is bound or fastened in the book 12.

The cases 1, 40, 80, 200 referred to in the above examples are bound or fastened in the book 12 at the ends 10 and 11. As a further modified example of the present invention, the cases may be bound or fastened in the book at the outer part 16 or 33.

Figure 15:
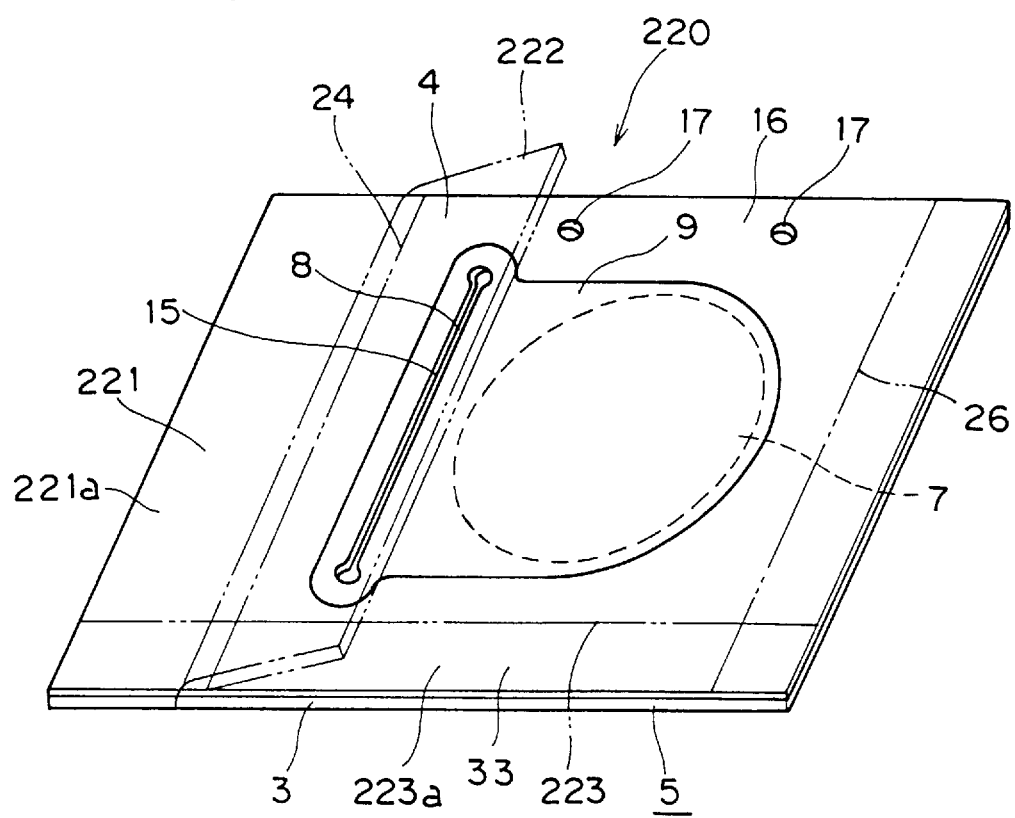
FIG. 15 is a front view showing a case 220 for casing recording media in a further modified example according to the present invention.

FIG. 15 is a perspective view showing a case 220 for casing recording media according to a further one of modified examples of the present invention. The case 220 is provided with a cover 221 instead of the board 2 in the case 1. Explanation will be omitted on the same structures as those of the case 1 for which the same reference numerals are put.

The cover 221 is formed as linked to the board material 5 and the film 6 and can be folded at the folding section 4 as indicated in FIG. 15 by a phantom line 222. The cover 221 when folded covers the gateway 8. The case 220 having the board material 5 together with the cover 221 in the state of being folded and covering the gateway 8 is bound or fastened in a book 12 at an outer part 33. By this feature, the discs 7 are prevented, by the folding section 4, from falling off the casing spaces 9, and the effect of preventing burglaries is obtained. Moreover, a perforated line 223 may be formed at the outer part 33 similarly to the perforated lines 25, 26. The case 220 is bound or fastened in the book 12 at a part 223a located outside of the perforated line 223 so that the case 220 may be readily torn in the perforated lines 223 to unfold the cover 221 and allow the discs 7 to be readily taken out. Alternatively, the cover 221 may be torn at the folding section 4 to take out the discs 7.

As a further modification of the invention, the case 220 may be bound or fastened in the book 12 at a part near the folding section 4 or at the outer part 16.

FIG. 16 is a perspective view showing a case 250 for casing recording media according to a further one of modified examples of the present invention. The case 250 is similar in structure to the foregoing case 1. Explanation will be given only on a different feature from the case 1 but not on the same structures as those of the case 1 for which the same reference numerals are put.

The case 250 is provided with a further board 251 in continuation to the end 26 of the board 3 of the case 210. The board 251 is substantially similar in structure to the board 2 and not referred to here minutely. The case 250 comprises three boards 2, 3 and 251 and can be folded in three, as indicated by the phantom lines in FIG. 16, at the folding section 4 and a folding section 252 between the boards 3 and 251. The case 250 folded in three can be bound or fastened in the book 12 at the folding section 252 including one end, i.e., the end 10 of the board material 5 located externally, so that the same effect as of the case 210 can be obtained. Furthermore, the board 251 to which the film 6 is adhered is provided with a perforated line 253 similar to the perforated lines 25, 26 in which perforated line 253 the board 251 can be cut. By this feature, the case 250 bound or fastened in the book 12 can be cut in the perforated lines 25, 26 and 253 to take out the discs 7. Otherwise, the discs 7 can be taken out by cutting the case 250 at the folding section 4. A case having three boards 2, 3 and 251 may be provided or structured according to the above.

As a further modification of the invention, the case 250 may be bound or fastened in the book 12 at the outer part 16 or 33.

FIG. 17 shows a cut 70, in a further example of the present invention, which may be formed in the above examples at a part of the perforated line 24 on the peripheral part 16. The cut 70 is almost triangular and its utmost end 70a adjoins the perforated line 24. By this feature, when an external force is applied to cut the case 1, 40, 60 along the perforated line 24, stress corresponding to the external force is caused to concentrate on a corresponding part of the perforated line 24 to the utmost end 70a of the cut 70, whereby the case can be readily cut from the side of the outer part 16 along the perforated line 24 with a facilitated convenience in use.

The cut 70 may be formed at a part of the perforated line 24 on the outer part 33 opposite to the outer part 16 so that the case can be readily cut from the side of the outer part 33 with a facilitated convenience in use. Moreover, the cut 70 may be provided at the parts of the perforated line on the outer parts 16 and 33, so that the case may be cut along the perforated line 24 from the side of either the outer part 16 or that 33 with a further facilitated convenience in use.

Furthermore, at least either of the parts of the perforated line 25 on the outer parts 16 and 33 may be provided with a cut having an utmost end 70a adjoining each part of the perforated line 25 in the same manner as the cut 70, so that the case can be cut along the perforated line 25 from the side of the outer part 16, that 33, or either of them. This also facilitates convenience in use as the cut 70.

Moreover, at least either of the parts of the perforated line 253 on the outer parts 16 and 33 may be provided with a cut having an utmost end adjoining each part of the perforated line 253 in the same manner as the cut 70, so that the case can be cut along the perforated line 253 from the side of the outer part 16, that 33, or either of them. This also facilitates convenience in use as the cut 70.

Moreover, at least either of the parts of the perforated line 223 on the end 11 of board and the end 221a of the cover 221 may be provided with a cut having an utmost end adjoining each part of the perforated line 223 in the same manner as the cut 70, so that the case can be cut along the perforated line 223 from the side of the end 11, that 221a or either of them. This also facilitates convenience in use as the cut 70.

As a further example of the present invention, for example, a nonwoven fabric may be adhered on the board material 5 at a part facing the casing spaces 9, 41 and 61 to allow a recording surface of the cased discs 7 to face the nonwoven fabric and thereby be prevented from being damaged. Besides, the disc-like shaped recording media may be not limited to the discs 7 but include floppy discs, mini-discs and other types of recording media, for which the present invention can be adapted or structured to case. Moreover, the recording media may be circular, rectangular or in other shapes.

As a further example of the present invention, the board material 5 may be made of synthetic resin, and the sheet member may be made of fabric or paper and do not necessarily need to have light-transmission properties. Furthermore, the sheet member when using the film 6 may be laid plurally and adhered on one side of the board material to provide a plurality of casing spaces on that side. Besides, the sheet member may be adhered on both sides of the board material, which not provided with the recessed parts in this feature, to form the casing spaces on both sides of the board material. Furthermore, in the above examples, a plurality of casing spaces may be formed for each board 2, 3.

What is claimed is:

1. A case for casing recording media, comprising:
   a board element which has an area larger than a planar shape of a recording medium to be cased and includes a casing region larger than the recording medium; and
   a sheet member adhered to the board element at a residual region located externally of the casing region, wherein the casing region between the board element and the sheet member is provided with a casing space for casing the recording medium, and the casing space has an opening with a length for allowing the recording medium to pass, wherein portions of the sheet member have arcuate portions that extend from ends of the length of the opening, a distance between the arcuate portions being longer than the length of the opening.

2. A case for casing recording media as set forth in claim 1, wherein the casing region is provided therein with a recess extending away from the sheet member with respect to the residual region.

3. A case for casing recording media as set forth in claim 1, wherein the casing region is provided therein with a recess extending away from the sheet member with respect to the residual region, and the sheet member is provided to cover the whole of a surface of one side of the board element, is adhered thereto at the residual region exclusive of the casing region, and is provided with the opening.

4. A case for casing recording media as set forth in claim 1, wherein the casing region is provided therein with a recess extending away from the sheet member with respect to the residual region; the sheet member is provided to cover the whole of a surface of one side of the board element, is adhered thereto at the residual region exclusive of the casing region, and is provided with the opening; and the board element adhered to the sheet member is provided at an outer part with a through bore.

5. A case for casing recording media, comprising:
   a board element which has an area larger than a planar shape of a recording medium to be cased and includes a casing region larger than the recording medium; and
   a sheet member adhered to the board element at a residual region located externally of the casing region, wherein the casing region between the board element and the sheet member is provided with a casing space for casing the recording medium, wherein the casing space is open for allowing the recording medium to pass, wherein the case is fixed to an article with at least the opening of the casing space being covered, the opening having a length, and wherein portions of the sheet member have arcuate portions that extend from ends of the length of the opening, a distance between the arcuate portions being longer than a length of the opening.

6. A case for casing recording media as set forth in claim 5, wherein the casing region is provided therein with a recess extending away from the sheet member with respect to the residual region.

7. A case for casing recording media as set forth in claim 5, wherein the casing region is provided therein with a recess extending away from the sheet member with respect to the residual region, and the sheet member is provided to cover the whole of a surface of one side of the board element, is adhered thereto at the residual region exclusive of the casing region, and is provided with the opening.

8. A case for casing recording media as set forth in claim 5, wherein the casing region is provided therein with a recess extending away from the sheet member with respect to the residual region; the sheet member is provided to cover the whole of a surface of one side of the board element, is adhered thereto at the residual region exclusive of the casing region, and is provided with the opening; and the board element adhered to the sheet member is provided at an outer part with a through bore.

9. A case for casing recording media, comprising:
   a board element which has an area larger than a planar shape of a recording medium to be cased and includes a plurality of casing regions for the recording media; and
   a sheet member adhered to a surface of one side of the board element at predetermined residual regions located externally of the casing regions,
   wherein a plurality of casing spaces are formed between the board element and the sheet member correspondingly to the plurality of casing regions, and each casing space is open at a portion for allowing the recording medium to pass, wherein the case with the board element adhered to the sheet member being folded at a folding section between the casing regions is fixed to an article at one lateral side of the case including at least one end of the board element located externally, and wherein the open portion of each casing space is located nearer to the folding section than to an edge of the case opposite the folding section.

10. A case for casing recording media as set forth in claim 9, wherein the casing region is provided therein with a recess extending away from the sheet member with respect to the residual region.

11. A case for casing recording media as set forth in claim 9, wherein the casing region is provided therein with a recess extending away from the sheet member with respect to the residual region, and the sheet member is provided to cover the whole of a surface of one side of the board element, is adhered thereto at the residual region exclusive of the casing region, and is provided with the opening.

12. A case for casing recording media as set forth in claim 9, wherein the casing region is provided therein with a recess extending away from the sheet member with respect to the residual region; the sheet member is provided to cover the whole of a surface of one side of the board element, is adhered thereto at the residual region exclusive of the casing region, and is provided with the opening; and the board element adhered to the sheet member is provided at an outer part with a through bore.

13. A case for casing recording media comprising:

a board element which has an area larger than a planar shape of a recording medium to be cased;

a sheet member which is laid on the board element to form a casing space for casing a recording medium, is adhered to the board element at a part surrounding the casing space, and is provided with a gateway which communicates with the casing space at a point near the same to allow the recording medium to be put into and taken out of the casing space; and a cover which connects with at least one of the board element and the sheet member and is laid on the sheet member to cover at least a part of the gateway, the cover further being adapted to be fixed on the board element at a part nearer its peripheral side than the casing space and the gateway in which state the recording medium cannot be taken out of and put into the casing space through the gateway, the cover also capable of being one of: (a) torn at the fixing position of the cover on the board element, and (b) separated from the board element and the sheet member, wherein the case is fixed to an article at the fixing position of the cover on the board element, wherein the case is fixed, at a side thereof, to the article, and has another side opposite the side that is fixed to the article, and wherein the gateway is located nearer to the side of the case that is fixed to the article than to the another side opposite thereof.

\* \* \* \* \*